United States Patent Office 3,324,456

Patented June 6, 1967

3,324,456

BINARY COUNTER

Charles W. Brown, Burbank, and Grey E. Stone, Covina, Calif., assignors to General Precision, Inc., a corporation of Delaware Filed Jan. 22, 1963, Ser. No. 253,206
2 Claims. (Cl. 340—172.5)

Figure 1:
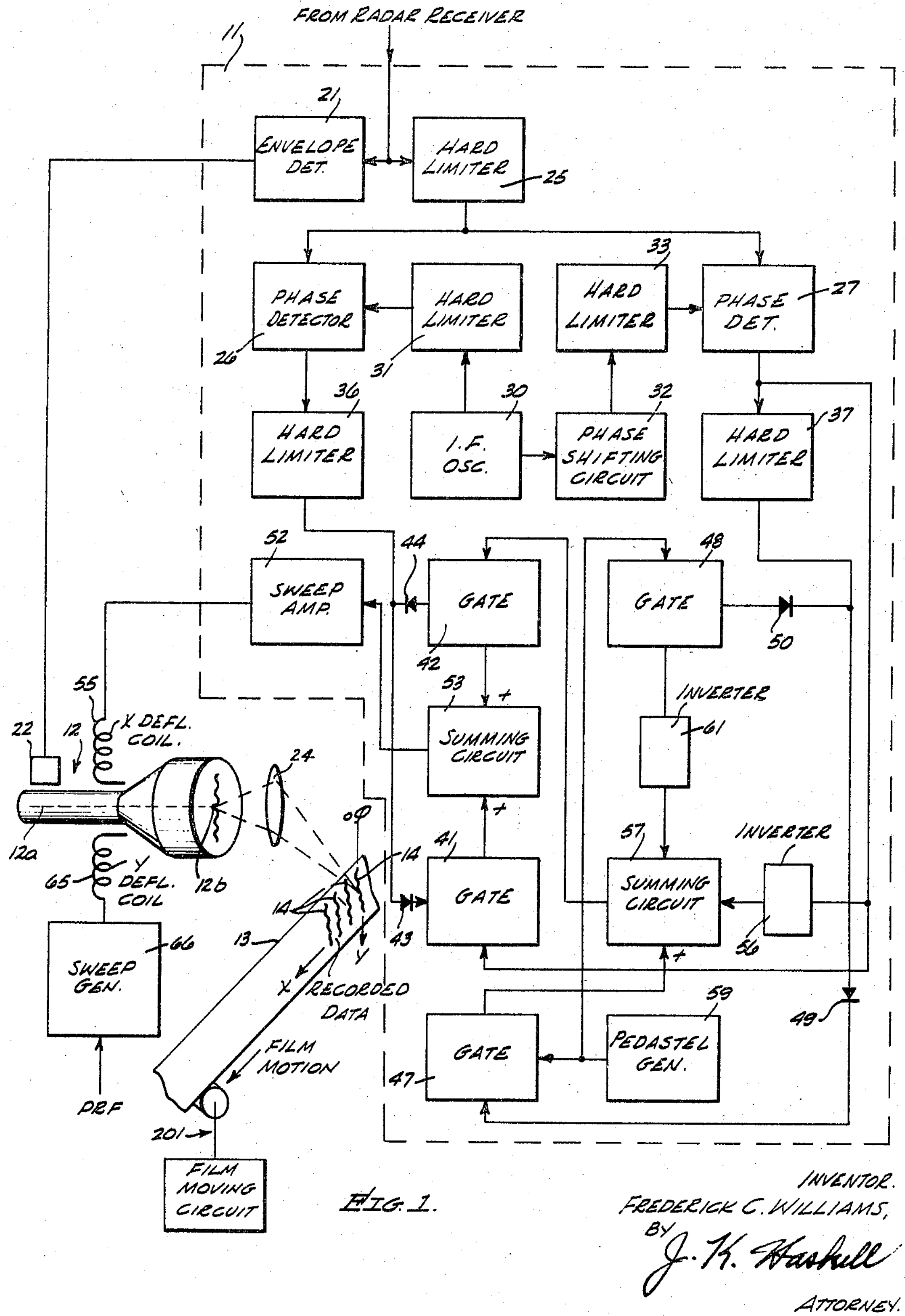

The present invention relates to an improved binary counter for use in electronic digital computers and the like, and it relates more particularly to an improved binary counter which is particularly adapted to count to a reference count from a predetermined setting corresponding to any selected multi-digit binary number.

The embodiment of the invention to be described takes the form of a dynamic circulating register and associated logic and control circuitry. The system of the invention is capable of providing a binary count for any multi-digit binary number introduced into the register, and this count continues in a step-by-step manner until a predetermined reference is reached, at which time a suitable output indication is provided.

It is, accordingly, an object of the present invention to provide an improved binary counter system which is simple in its construction and which functions to count binarily in a unique and simplified manner.

A further object of the invention is to provide such an improved binary counter system which incorporates a circulating register and associated logic and control circuitry, and in which a desired binary counting function is achieved without the need for bi-stable circuits or similar components.

Yet another object of the invention is to provide such an improved binary counter system which is capable of being set in accordance with any desired multi-digit binary number and of providing a count from that number to a predetermined reference, this being achieved in a simple and straightforward manner and by means of simple components and associated circuitry.

Other objects of the invention will become apparent from a consideration of the accompanying drawings, in which:

FIGURE 1 is a block diagram of a binary counter system constructed in accordance with one embodiment of the invention; and FIGURE 2 is a table illustrating a usual binary series of multi-digit binary numbers.

The system to be described includes various logic circuits and components, such as "and" gates, "or" gates, and the like. These components are well known to the electronic digital computer art, and they may incorporate any suitable diode or transistor circuitry. The circuitry of the individual components forms no part of the present invention, and for that reason, the individual circuits are not described in detail herein.

The system of FIGURE 1 includes a storage means 10. This storage means is of the dynamic type through which multi-bit binary signals are serially circulated at successive bit times. These bit times are under the control of an appropriate bit timing counter (not shown). In the particular example, the dynamic storage means is shown as having eight successive bit positions, designated $t_0$–$t_7$.

The dynamic storage means 10 may, for example, be a track on the magnetic drum or disc, or other movable magnetic memory member, of a digital computer, or the like. When the storage means 10 is so formed, usual and suitable read and write electro-magnetic transducer heads are provided, and these heads are magnetically coupled to the track, as is well known.

It will be evident to those skilled in the art, that the storage means 10 may take other forms. For example, the storage means may be formed by delay lines, or other dynamic storage instrumentalities.

In the illustrated schematic representation, a writing means 12 is coupled to one end of the storage means 10, and a sensing means 14 is coupled to the other end. As indicated above, when the temporary storage means is formed by a track on a movable magnetic memory member, the writing means 12 and sensing means 14 take the form of electro-magnetic transducer heads, these heads being magnetically coupled to the track, as mentioned above.

The sensing means 14 is coupled to a read amplifier 16, or other appropriate sensing circuitry. The read amplifier 16 includes a flip-flop circuit, or other type of complementing circuitry, and it includes two output terminals. The binary signals sensed from the storage means 10 are serially produced in their original form at successive bit times at one of the output terminals, designated $R_c$. At the same time, the binary signals sensed by the sensing means 14 are produced at successive bit times in serial form at the other output terminal in complemented form, as designated $\overline{R}_c$.

The output terminal $R_c$ is connected to an "and" gate 18. The output terminal $\overline{R}_c$ of the read amplifier 16 is coupled to an "and" gate 22.

The "and" gates 18 and 22 are, in turn, connected to an "or" gate 24. The "or" gate 24 is connected to a write amplifier 30. The write amplifier 30 is coupled to the writing means 12, and it serves to introduce the binary signals to the storage means 10 in serial form and at successive bit times through the writing means 12.

The circuitry of FIGURE 1 includes a control flip-flop 32. The flip-flop 32 has a set output terminal connected to the "and" gate 22 and to an "and" gate 26. The control flip-flop 32 has a reset output terminal connected to the "and" gate 18 and to an "and" gate 28. The "and" gates 22 and 26 are connected to an "or" gate 33, the "or" gate 33 is connected to an "and" gate 34. The "and" gate 34 is connected to an output terminal 35.

The "and" gates 26 and 28 are also connected to the "or" gate 24. The "or" gate 24 is connected through an inverter 19 to a delay line 20. The delay line 20 imparts a delay corresponding to one bit time to binary signals introduced to its input terminal.

A bit timing signal $t_0$ from the bit timing counter is introduced to the set input terminal of the control flip-flop 32 to set the control flip-flop at the beginning of each circulation of the binary signals through the circuitry of FIGURE 1. A bit timing signal $\overline{t}_0$ is introduced to an "and" gate 36, which is connected to the reset input terminal of the control flip-flop 32. The delay line 20 is also connected to the "and" gate 36. A bit timing signal $t_7$ is applied to the "and" gate 34.

The system also includes a read-in flip-flop 38. Appropriate read-in control logic is coupled to the set input terminal of the read-in flip-flop 38, and appropriate recirculating control logic is coupled to the reset input terminal of the read-in flip-flop. The set output terminal of the flip-flop 38 is connected to the "and" gates 26 and 28, and the reset output terminal of the flip-flop 38 is connected to "and" gates 18 and 22. The multi-bit binary-coded signal, which establishes the initial setting of the binary counter system of FIGURE 1, is introduced into the system, by way of an input terminal N, to the "and" gate 28; and the complement of the input signal is introduced into the system, by way of an input terminal $\overline{N}$, to the "and" gate 26.

As mentioned above, the circuitry of the blocks in FIGURE 1 is well known, and any appropriate circuitry may be used for the individual components. The flipthe first and second outputs of said sensing apparatus to the writing apparatus for circulating the binary signals for each such circulation cycle from the first output of the sensing apparatus in original form to the writing apparatus for a first operating condition of the control circuitry, and for circulating the binary signals for each such circulation cycle from the second output of the sensing apparatus to the writing apparatus in complemented form for a second writing condition thereof; logic circuitry coupled to the control circuitry for establishing the control circuitry in one of its operating conditions at the beginning of each such circulation cycle of the binary signals to the writing apparatus and for establishing the control circuitry in the other of its operating conditions for the succeeding bit times of the corresponding circulation cycle in response to a binary signal of a predetermined binary value in the circulated binary signals; and output circuitry coupled to the control circuitry for providing an output indication at the end of any circulation cycle of the binary signals through the control circuitry during which the control circuitry remains in its first operating condition throughout such circulation cycle to indicate that the binary counter system has reached a predetermined reference count.

2. The binary counter system recited in claim 1, in which said input circuitry is coupled to said control circuitry to be controlled thereby, so as to cause one bit of said input binary signals to be complemented as said input binary signals are fed into said dynamic storage apparatus during the corresponding circulation cycle so that the first count of the binary counter system occurs during the input operation.

References Cited

UNITED STATES PATENTS

| | | | |
|---|---|---|---|
| 2,889,987 | 6/1959 | Marcus ______________ | 235—92 |
| 3,219,802 | 11/1965 | Frank et al. ______ | 340—172.5 |

ROBERT C. BAILEY, *Primary Examiner.*

M. LISS, P. J. HENON, *Assistant Examiners.*

INVENTOR.
FREDERICK C. WILLIAMS,
BY J. K. Haskell
ATTORNEY.